March 28, 1950     A. H. LAMB ET AL     2,502,159
CONTACT MAKING THERMOMETER
Filed April 15, 1948
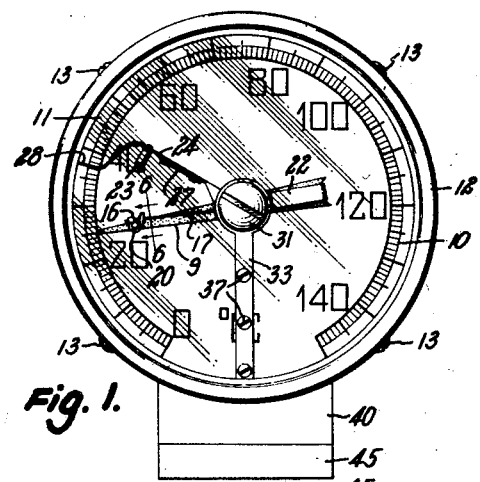
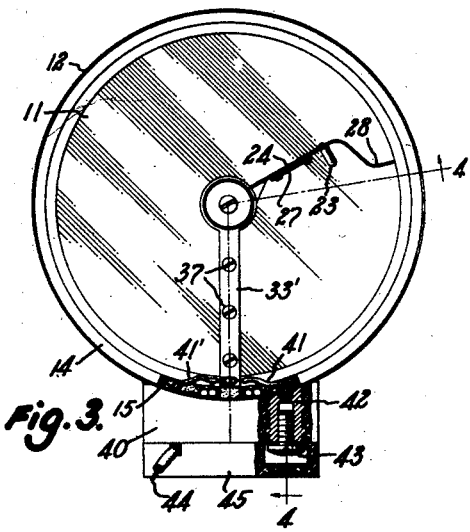
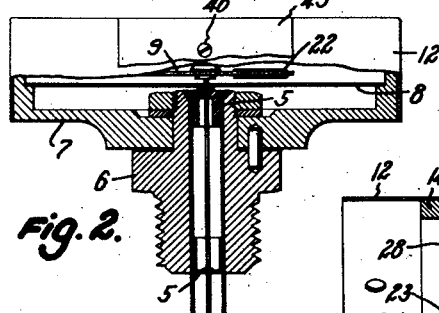

Patented Mar. 28, 1950

2,502,159

UNITED STATES PATENT OFFICE 2,502,159

CONTACT MAKING THERMOMETER

Anthony H. Lamb, Hillside, and Edward M. Eadie, Jr., Westfield, N. J., assignors to Weston Electrical Instrument Corporation, Newark, N. J., a corporation of New Jersey Application April 15, 1948, Serial No. 21,144

5 Claims. (Cl. 200—56)

This invention relates to a contact making thermometer or thermally actuated switch, and more particularly to a contact making thermometer of the bimetallic type.

Various arrangements for closing switch contacts by thermometers of the bimetallic type have been proposed but, in general, such prior proposals were of no commercial value since the bimetallic operating elements were of low uniformity and of low accuracy, and did not provide a satisfactory control of the alarm or regulating system which was to respond to temperature changes. Improvements in mechanical constructions and manufacturing methods during the last decade have materially increased the stability and accuracy of bimetallic thermometers but such improvements in the thermometers per se have not afforded a satisfactory solution of the problem of constructing a thermally responsive switch or relay system. The contact pressures developed by the bimetallic elements as the temperature reaches the pre-selected control value have been relatively light and did not afford reliable closure of the previously proposed contact systems.

Objects of the present invention are to provide contact making thermometers of the bimetallic type which eliminate the errors and uncertainty of the prior art. Objects are to provide contact making thermometers having magnetic contact systems which develop reliable non-chattering contact closures. More specifically, an object is to provide a contact making thermometer of the bimetallic type in which the thermometer pointer carries a pair of flexibly mounted contacts of magnetic material, and the cooperating contact element comprises a pair of small permanent magnets on arms mounted upon the cover glass of the thermometer for angular adjustment about the axis of the pointer.

These and other objects and the advantages of the invention will be apparent from the following specification when taken with the accompanying drawings in which:

Fig. 1 is a front elevation of a contact making thermometer embodying the invention;

Fig. 2 is a bottom view, principally in central section, of the same;

Fig. 3 is a rear or inside view of the housing cover, and the circuit elements and contacts carried by the same;

Fig. 4 is a section of the cover and associated elements, on a larger scale, as seen on the section indicated by line 4—4 of Fig. 3;

Fig. 5 is a perspective, on the larger scale, of the thermometer pointer and associated movable contact system;

Fig. 6 is a fragmentary sectional view of the same as seen in section on line 6—6 of Fig. 1; and Fig. 7 is an exploded view, in perspective, of the relatively stationary contact assembly and associated terminal conductors.

In the drawings, the reference numeral 1 identifies the thermometer stem or tubular shell within which a bimetallic coil 2 is supported by a cap 3 which closes the lower end of the shell. A staff 4 is secured to the upper end of the coil 2 and is loosely guided by ring bearings 5 which are pressed into or soldered within the shell. The outer end of the staff 4 extends through the threaded mounting head 6 and circular cup-shaped base 7 of the housing in which a circular scale plate 8 is mounted. A pointer 9 of insulating material is secured to the outer end of the staff 4 for cooperation with the arcuate scale 10 of temperature graduations. The housing is completed by a cover glass 11 and cylindrical sleeve 12 which has a tight sliding fit upon the outer wall of the base 7 and is secured to the same by screws 13; the cover glass being held against the flanged outer end of the housing sleeve 12 by a spring ring 14 which seats against a sealing washer 15.

As noted above, the thermometer pointer 9 is a thin strip of insulating material upon which, in accordance with the invention, the movable contact assembly is mounted. This assembly comprises a pair of soft iron cylinders 16, 16' swaged or otherwise secured upon the ends of resilient wires 17, 17' whose inner ends are anchored to a post 18 which is mounted on the pointer 9 adjacent the staff 4. The soft iron cylinders 16, 16' are preferably silver plated, and the fixed ends of wires 17, 17' are electrically connected by solder 19. The cylinders 16, 16' normally rest against a soft iron post 20 which is secured to the pointer 9, and the flexing of the resilient wires 17, 17' is limited by a yoke or guard wire 21 which is clamped to the pointer by the post 20. The pointer is balanced by a U-shaped strip of metal 22 which is fitted upon the rear end of the pointer.

The relatively stationary contact assembly comprises a pair of small permanent magnet contacts 23, 23' on metal strips 24, 24' respectively which are bent at right angles to and extend radially outward from their circular heads which are secured by screws 25 to an insulating bushing 26, see Figs. 4 and 7. The metal strips 24, 24' are riveted to a strip 27 of insulating material which provides rigidity for simultaneous adjustment. The strip 24 has an extension 28 which overlies the graduated scale and is bent towards the pointer 9 by an angular amount equal to the effective range of magnetic attraction of the magnet contacts 23, 23'.

The insulating bushing 26 has a non-circular bore for fitting upon a complementary non-circular cross-section of a stud 29 which is journalled in a resilient sealing washer 30 seated in an opening through the cover glass 11, the axis of the stud 29 being alined with the axis of the thermometer staff 4. The head 31 of the stud 29 is slotted to facilitate angular adjustment of the metal strips 24, 24' to set the extension or index tip 28 at the particular temperature at which the magnetic contacts 16, 16' will be pulled into firm contact engagement with the permanent magnet contacts 23, 23'. As illustrated in Fig. 1, the index tip is set at the 37° C. graduation.

The circuit connections to the metal strips 24, 24' are established through the annular heads 32, 32' of terminal strips 33, 33' respectively; the annular heads 32, 32' being oppositely dished and resilient to seat their rim portions firmly upon the inner ends of the strips 24, 24' when the contact system is assembled upon the stud 29. An insulating washer 34 with a non-circular bore is fitted upon the stud 29 between the annular head 32' and a metal washer 35, and the assembly is completed by a screw 36 which is threaded into the inner end of the stud 29. The bores of the annular heads 32, 32' are of such size as to clear the stud 29, and the length of the stud is such that the resilient heads 32, 32' are compressed to establish a frictional resistance which prevents inadvertent angular movement of the stud 29 and the magnetic contacts 23, 23'.

Screws 37 secure the terminal strips 33, 33' to the opposite faces of an insulating strip 38 which is fixed against movement by a pin 39 which extends into a bore in the outer end of the insulating strip 38, through the cover sleeve 12 and into a terminal block 40 of insulating material, preferably a molded plastic. The outer ends of terminal strips 33, 33' are electrically connected by soldered leads 41, 41' to threaded bushings 42 which are molded in the terminal block 40, and into which screws 43 are threaded to make connections to external leads 44 of the alarm or control circuit. An insulating cover 45 is secured over the block 40 by a screw 46, the cover being notched to pass the leads 44.

The contact making thermometer is secured in a threaded opening of a vessel by the mounting head 6, and with the stem 1 immersed in the liquid or granular material which is under treatment. The relatively stationary contact assembly is adjusted angularly by the stud 29 to set the extension or index 28 at the preselected temperature at which an alarm or control circuit is to be closed. If and when the measured temperature reaches the critical value, the soft iron contacts 16, 16' are attracted by and snap into engagement with the magnetized contacts 23, 23' to complete a bridging circuit between the same. The pointer 9 is displaced clockwise by the magnetic attraction since the post 20 is likewise attracted to the magnetized contacts 23, 23'. Upon a subsequent decrease in temperature the bimetallic coil 2 develops an increasing, reverse torque tending to separate the contacts. When the temperature drops a predetermined number of degrees the reverse torque developed by the bimetallic coil becomes sufficient to overcome the magnetic attraction between the magnets 23, 23' and the soft-iron post 20, at which point the post 20 springs away from said contacts 23, 23'. When this happens the pointer 9 is displaced in a counter-clockwise direction and the guard yoke 21 strikes the flexible wires 17, 17' a relatively sharp blow causing instantaneous separation of the soft-iron contact 16, 16' from the magnetic contacts 23, 23', respectively. Thus, even though the temperature decreases slowly, physical separation of the cooperating sets of contacts is very rapid, thereby preventing damage due to electrical arcing across the contacts as is the case when contacts slowly separate to open an electrical circuit. Alternatively, the apparatus may be immediately reset by the operator upon the closure of an alarm circuit by turning the slotted head 31 of stud 29 clockwise.

Except for the bridging contacts on the pointer 9, all parts of the contact system and its circuit connections are mounted upon the housing cover and may be removed with the cover for inspection or for a check of the calibration of the thermometer.

It is to be understood that the invention is not limited to the particular embodiment herein shown and described since various changes which may occur to those familiar with the art fall within the spirit and scope of the invention as set forth in the following claims.

We claim:
1. A contact making thermometer comprising a stem, a bimetallic coil within said stem, a staff angularly movable by said coil, a pointer on said staff, a scale plate, a housing enclosing said pointer and scale plate, said housing having a removable cover assembly including a cover plate, magnetic contact means supported by said cover plate, and cooperating contact means carried by said pointer; said cooperating contact means comprising a pair of soft iron contacts on resilient wires secured to said pointer and electrically connected to each other.

2. A contact making thermometer as recited in claim 1, wherein a yoke is mounted on said pointer to limit the flexing of said resilient wires.

3. A contact making thermometer as recited in claim 1, wherein terminal strips are secured in fixed position on said cover assembly to establish electrical connections to said magnetic contact means carried by said cover plate.

4. A contact making thermometer as recited in claim 3, wherein said magnetic contact means carried by said cover plate includes a pair of magnetized contacts insulated from each other and supported on radially extending arms having circular head portions coaxial with said pointer, an insulating bushing secured to said head portions, said terminal strips having annular portions contacting said head portions of said radially extending arms, and a stud extending through said cover plate and having a non-circular portion extending through a correspondingly shaped non-circular bore of said insulating bushing whereby angular adjustment of said stud results in corresponding angular adjustments of the radially extending arms carrying said magnetized contacts.

5. A contact making thermometer as recited in claim 4, in combination with a terminal block secured to said removable cover assembly, said terminal block carrying means for establishing electrical connections between said terminal strips and an external circuit.

ANTHONY H. LAMB.
    EDWARD M. EADIE, Jr.

REFERENCES CITED

The following references are of record in the file of this patent:

UNITED STATES PATENTS

| Number | Name | Date |
|---|---|---|
| 942,497 | Harris | Dec. 7, 1909 |
| 1,198,845 | Hendrix | Sept. 19, 1916 |
| 1,976,954 | Mantz | Oct. 16, 1934 |
| 2,100,214 | Graham | Nov. 23, 1937 |
| 2,193,731 | Lamb | Mar. 12, 1940 |